United States Patent
Kitagawa et al.

(10) Patent No.: US 11,411,458 B2
(45) Date of Patent: Aug. 9, 2022

(54) ROTATING MACHINE LUBRICATION STRUCTURE

(71) Applicant: TOYOTA JIDOSHA KABUSHIKI KAISHA, Toyota (JP)

(72) Inventors: Katsuhide Kitagawa, Seto (JP); Masaki Mori, Anjo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 140 days.

(21) Appl. No.: 16/748,855

(22) Filed: Jan. 22, 2020

(65) Prior Publication Data
US 2020/0251955 A1 Aug. 6, 2020

(30) Foreign Application Priority Data
Jan. 31, 2019 (JP) .............................. JP2019-016422

(51) Int. Cl.
*H02K 9/19* (2006.01)
*H02K 5/20* (2006.01)

(52) U.S. Cl.
CPC ................. *H02K 5/20* (2013.01); *H02K 9/19* (2013.01)

(58) Field of Classification Search
CPC ............ H02K 5/20; H02K 5/02; H02K 5/161; H02K 5/04; H02K 5/08; H02K 9/16; H02K 9/19; H02K 9/18; H02K 9/197; H02K 9/20; H02K 9/06; H02K 11/225
See application file for complete search history.

(56) References Cited

U.S. PATENT DOCUMENTS

| 2013/0009522 A1* | 1/2013 | Ozaki | H02K 7/116 310/67 R |
| 2015/0042190 A1* | 2/2015 | Nagumo | H02K 5/225 310/71 |
| 2018/0287474 A1 | 10/2018 | Takeuchi | |

FOREIGN PATENT DOCUMENTS

| JP | 2013-179812 A | 9/2013 |
| JP | 2017-118688 A | 6/2017 |
| JP | 2018-170909 A | 11/2018 |

* cited by examiner

*Primary Examiner* — Bryan R Perez
(74) *Attorney, Agent, or Firm* — Oblon, McClelland, Maier & Neustadt, L.L.P.

(57) ABSTRACT

A rotating machine lubrication structure is applied to a rotating machine including a cylindrical stator, a rotor and a shaft. A resolver is disposed concentrically with the rotating machine center line between the bearing and the rotor in a direction of the rotating machine center line in the casing, the resolver includes an annular resolver stator fixed to an inner side surface of the casing in an outer circumferential portion of the resolver stator, and a resolver rotor disposed on an inner circumferential side of the resolver stator and fixed to and integrally rotated with the shaft, and the resolver stator is provided with an oil through-hole allowing the lubricating oil to flow through at a portion on an inner circumferential side relative to a part fixed to the casing.

16 Claims, 3 Drawing Sheets

ROTATING MACHINE LUBRICATION STRUCTURE

This application claims priority from Japanese Patent Application No. 2019-016422 filed on Jan. 31, 2019, the disclosure of which is herein incorporated by reference in its entirety.

FIELD OF THE INVENTION

The present invention relates to a rotating machine lubrication structure and, more particularly, to a lubrication structure for a rotating machine including a resolver disposed in a casing.

DESCRIPTION OF THE RELATED ART

A known rotating machine lubrication structure is applied to a rotating machine including a cylindrical stator disposed in a casing concentrically with a rotating machine center line and fixed to the casing, (a rotor disposed concentrically with the rotating machine center line in the casing and on the inner circumferential side of the stator, and a shaft disposed concentrically with the rotating machine center line, rotated integrally with the rotor, and supported rotatably around the rotating machine center line by the casing via a bearing, wherein the stator is cooled by a lubricating oil supplied to the stator from a lubricating oil passage disposed in the casing, while the bearing is lubricated by the lubricating oil flowing down from the stator. An apparatus described in Patent Document 1 is an example thereof.

PRIOR ART DOCUMENTS

Patent Documents

Patent Document 1: Japanese Laid-Open Patent Publication No. 2013-179812
Patent Document 2: Japanese Laid-Open Patent Publication No. 2018-170909

SUMMARY OF THE INVENTION

Technical Problem

A technique of disposing a resolver in a casing of a rotating machine is proposed (see Patent Document 2). Specifically, a resolver is disposed concentrically with the rotating machine center line between the bearing and the rotor in a direction parallel to the rotating machine center line in the casing, and the resolver is configured to include (a) an annular resolver stator fixed to an inner side surface of the casing in an outer circumferential portion of the resolver stator, and (b) a resolver rotor disposed on the inner circumferential side of the resolver stator and fixed to and integrally rotated with the shaft. In this case, the presence of the resolver may hinder the supply of the lubricating oil to the bearing. Although a clearance (gap) exists between the resolver stator and the resolver rotor, the resolver rotor is rotated integrally with the shaft, so that the lubricating oil is easily scattered due to a centrifugal force, which limits an amount of the lubricating oil supplied from the clearance to the bearing.

The present invention was conceived in view of the situations and it is therefore an object of the present invention to enable proper supply of a lubricating oil to a bearing provided outside a resolver in a rotating machine including the resolver disposed in a casing.

Solution to Problem

A first aspect of the present invention provides a rotating machine lubrication structure applied to a rotating machine including (a) a cylindrical stator disposed in a casing concentrically with a rotating machine center line and fixed to the casing, (b) a rotor disposed concentrically with the rotating machine center line in the casing and on an inner circumferential side of the stator, and (c) a shaft disposed concentrically with the rotating machine center line, rotated integrally with the rotor, and supported rotatably around the rotating machine center line by the casing via a bearing, (d) the stator being cooled by a lubricating oil supplied to the stator from a lubricating oil passage disposed in the casing, the bearing being lubricated by the lubricating oil flowing down from the stator, wherein (e) a resolver is disposed concentrically with the rotating machine center line between the bearing and the rotor in a direction parallel to the rotating machine center line in the casing, wherein (f) the resolver includes an annular resolver stator fixed to an inner side surface of the casing in an outer circumferential portion of the resolver stator, and a resolver rotor disposed on an inner circumferential side of the resolver stator and fixed to and integrally rotated with the shaft, and wherein (g) the resolver stator is provided with an oil through-hole allowing the lubricating oil to flow through at a portion on an inner circumferential side relative to a part fixed to the casing.

A second aspect of the present invention provides the rotating machine lubrication structure recited in the first aspect of the invention, wherein the oil through-hole is disposed at a radial position facing at least a portion of the bearing in the direction parallel to the rotating machine center line.

A third aspect of the present invention provides the rotating machine lubrication structure recited in the first or second aspect of the invention, wherein (a) a coil portion for rotation detection covered with a cover is disposed on an inner circumferential edge portion of the resolver stator to project to both sides in a direction parallel to the rotating machine center line, and wherein (b) the oil through-hole is disposed on an outer circumferential side relative to the coil portion and at a position above the rotating machine center line.

A fourth aspect of the present invention provides the rotating machine lubrication structure recited in any one of the first to third aspects of the invention, wherein the oil through-hole is one of a plurality of oil through-holes disposed at positions around the rotating machine center line and a portion of the plurality of oil through-holes is disposed at a position above the rotating machine center line.

A fifth aspect of the present invention provides the rotating machine lubrication structure recited in any one of the first to fourth aspects of the invention, wherein (a) a plurality of bolt holes having a circular arc shape around the rotating machine center line is disposed in the resolver stator at equal angular intervals around the rotating machine center line, wherein the resolver stator is fixed to the casing by bolts inserted through the bolt holes, and wherein (b) the oil through-hole is disposed along the bolt hole on an inner circumferential side relative to each of the plurality of bolt holes.

Advantageous Effects of Invention

In the lubrication structure of the rotating machine as described above, since the oil through-holes are disposed in the inner circumferential side portion of the resolver stator fixed to the inner side surface of the casing, a portion of the lubricating oil flowing down from the stator of the rotating machine flows into the oil through-holes directly, or indirectly by being scattered due to the rotation of the rotor and the shaft, and is supplied to the bearing. Since the resolver stator is fixed to the casing, the risk of scattering the lubricating oil due to a centrifugal force is eliminated, and the bearing can be supplied and properly lubricated with a sufficient amount of the lubricating oil by appropriately determining the size, number, position, etc. of the oil through-holes.

In the second aspect of the invention, since the oil through-hole is disposed at the radial position facing at least the portion of the bearing in the direction parallel to the rotating machine center line, the lubricating oil flowing out from the oil through-hole is more easily directly supplied to the bearing, and the bearing can efficiently be lubricated.

In the third aspect of the invention, since the oil through-hole is disposed around an area above the rotating machine center line on the outer circumferential side of the coil portion disposed in the inner circumferential edge portion of the resolver stator, a portion of the lubricating oil flowing down from the stator flows into the oil through-hole directly, or indirectly by being received by the coil portion, and is more easily supplied to the bearing, so that the bearing can properly be lubricated.

In the fourth aspect of the invention, since the oil through-hole is one of the plurality of oil through-holes disposed at the positions around the rotating machine center line and the portion of the plurality of oil through-holes is disposed at the position above the rotating machine center line, a portion of the lubricating oil flowing down from the stator flows into the plurality of oil through-holes directly, or indirectly by being scattered due to the rotation of the rotor and the shaft, and is supplied to the bearing, so that the bearing can properly be lubricated.

The fifth aspect of the invention is the case that the plurality of bolt holes having a circular arc shape is disposed in the resolver stator at equal angular intervals around the rotating machine center line, and the oil through-hole is provided on the resolver stator along the bolt hole on the inner circumferential side of each of the bolt holes. Therefore, as in the fourth aspect of the invention, a portion of the lubricating oil flowing down from the stator flows into the plurality of oil through-holes directly, or indirectly by being scattered due to the rotation of the rotor and the shaft, and is supplied to the bearing, so that the bearing can properly be lubricated.

Additionally, the presence of the oil through-hole increases a magnetic resistance on the inner circumferential side of the bolt holes, so that a magnetic flux from the outside more easily flows through an outer circumferential side portion of the bolt holes having a relatively low magnetic resistance, and therefore, the resolver is hardly affected by magnetism of a stator coil etc. of the rotating machine functioning as an electric motor and/or a generator, so that a magnetic noise (disturbance) is suppressed, and the resolver is improved in rotation detection accuracy. Since the bolt holes and the groups of the oil through-holes are disposed at equal angular intervals around the rotating machine center line, the magnetic resistance etc. are uniformly distributed around the rotating machine center line, and this is also advantageous for the rotation detection accuracy of the resolver.

MODES FOR CARRYING OUT THE INVENTION

Figure 1:
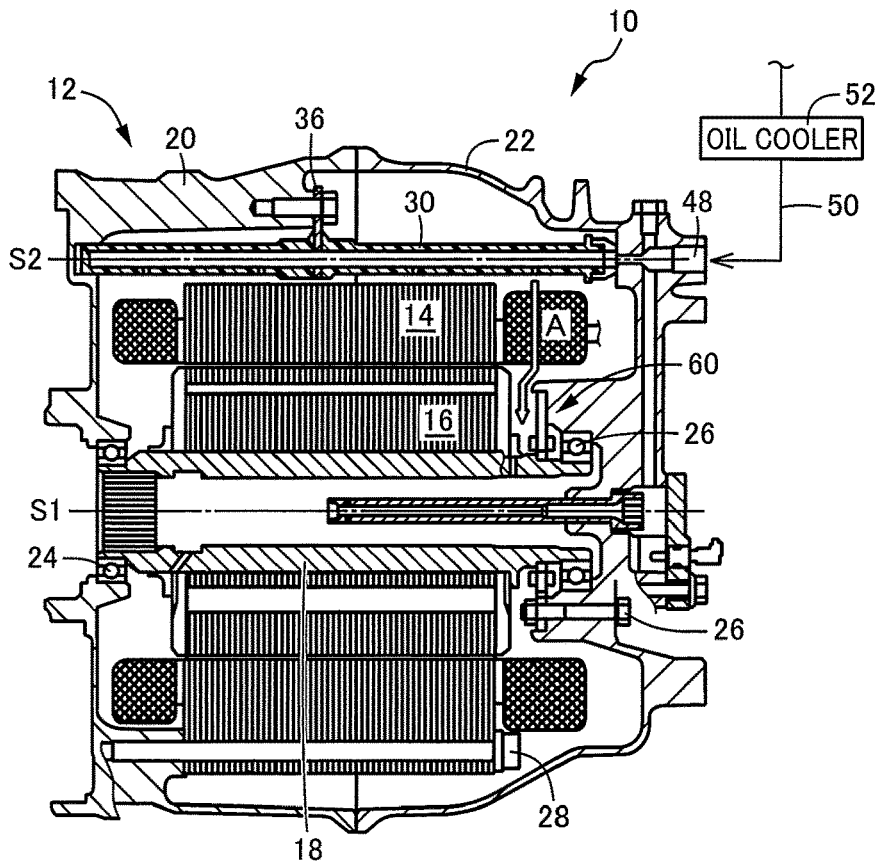
FIG. 1 is a diagram for explaining a rotating machine having a lubrication structure that is an example of the present invention and is a longitudinal cross-sectional view taken in a vertical direction along a first axis S1 that is a rotating machine center line.

The present invention is suitably applied to a lubrication structure of a rotating machine (an electric motor or a motor generator) used as a drive force source of a vehicle, for example, and is also applicable to a rotating machine of other than a vehicle. The present invention is also applicable to a rotating machine exclusively used as a generator. For example, a lubricating oil passage can be made up only of a fluid passage formed in a wall of a casing, or a pipe separate from the casing can be mounted on the inside of the casing, and the pipe can be used as the lubricating oil passage. The lubricating oil passage is supplied with a lubricating oil cooled by an oil cooler, for example, or may be supplied with the lubricating oil without passing through the oil cooler.

Oil through-holes disposed in a resolver stator may have at least a portion of opening portions on the bearing side exposed to the inner circumferential side relative to a fixed part for the casing, and the lubricating oil can flow from the exposed portion into the bearing side. The oil through-holes are disposed parallel to a rotating machine center line, for example, or may be disposed with an inclination relative to the rotating machine center line. The oil through-holes are disposed at a radial position such that the through-hole faces at least a portion of the bearing in a direction parallel to the rotating machine center line, or can be disposed at a radial position where all the opening portions on the bearing side of the oil through-holes are opened on the outer circumferential side or the inner circumferential side relative to the bearing. The multiple oil through-holes are desirably disposed around the rotating machine center line including an area above the rotating machine center line, or only one oil through-hole may be disposed at any position around the rotating machine center line. If needed, a guide member such as a receiving gutter can be disposed for guiding the lubricating oil flowing down from the stator of the rotating machine to the oil through-holes.

The resolver stator is fixed to the casing by multiple bolts inserted through bolt holes, for example, or can be non-rotatably fixed to the casing by other fixing means such as press fitting, splines, and crimping. When each of bolt holes having a circular arc shape around the rotating machine center line are formed, the oil through-holes can be disposed along the bolt holes on the inner circumferential side of the bolt holes. For example, the oil through-hole having a long hole shape such as a circular arc shape or a straight-line shape can be disposed along the circular arc shape of the bolt holes, i.e., substantially parallel to the bolt holes. The multiple oil through-holes such as round holes can be disposed side by side in a circular arc shape or in a straight-line shape. The oil through-holes can be disposed in a portion other than the inner circumferential side of the bolt holes regardless of the bolt holes and, for example, the oil through-holes can be disposed at an intermediate position between the bolt holes around the rotating machine center line. If a coil for excitation or rotation detection disposed in a coil portion is wound or guided by using a jig, the oil through-holes can be disposed at a position where the usability of the jig is improved, and the positions of the oil through-holes are determined as appropriate.

Example

An example of the present invention will now be described in detail with reference to the drawings. In the following example, the figures are simplified or deformed for description as needed and portions are not necessarily precisely drawn in terms of dimension ratio, shape, etc.

FIG. 1 is a diagram for explaining a rotating machine 10 having a lubrication structure that is an example of the present invention and is a longitudinal cross-sectional view taken in a vertical direction along a first axis S1 that is a center line of the rotating machine 10. The rotating machine 10 is mounted on a vehicle in a posture in which the first axis S1 is substantially horizontal and used as a drive force source for running and is a motor generator alternatively functioning as an electric motor and a generator in this example. The rotating machine 10 includes a cylindrical stator 14 disposed concentrically with the first axis S1 in a casing 12, and a rotor 16 disposed concentrically with the first axis S1 on the inner circumferential side of the stator 14. A shaft 18 extends to penetrate through the rotor 16 and project to both sides thereof and is fixed to a central portion of the rotor 16 concentrically with the first axis S1 to rotate integrally with the rotor 16.

The casing 12 includes a pair of a first casing member 20 and a second casing member 22 divided at an intermediate position in a direction parallel to the first axis S1. The first casing member 20 and the second casing member 22 each has a bottomed cylindrical shape and are brought closer to each other in the direction parallel to the first axis S1 and assembled integrally with each other by multiple bolts not shown such that opening portions of the first and second casing members 20 and 22 are abutted against each other to house the rotor 16 and the stator 14 therein. The shaft 18 fixed to the rotor 16 is supported by the casing 12 rotatably around the first axis S1 via a pair of bearings 24, 26, and the stator 14 is fixed to the first casing member 20 concentrically with the first axis S1 by multiple bolts 28. The stator 14 can also be fixed to the first casing member 20 by press fitting.

A pipe 30 is disposed in the casing 12. The pipe 30 has a straight elongated cylindrical shape, is disposed concentrically on a second axis S2 defined parallel to the first axis S1 and above the first axis S1, and is mounted on the casing 12 via a mounting bracket 36 etc. The pipe 30 corresponds to a lubricating oil passage disposed in the casing 12 and is allowed to communicate with a connection port 48 disposed in the second casing member 22, and the lubricating oil cooled by an oil cooler 52 is supplied from an external piping 50 through the connection port 48 to the pipe 30. Multiple discharge holes are disposed at intermediate positions in the longitudinal direction of the pipe 30, and the lubricating oil flowing out from the discharge holes is allowed to flow down onto a coil etc. of the stator 14 to cool the coil etc., and the lubricating oil flowing down from the coil is then supplied to the bearings 24, 26 etc. to cool and lubricate the bearings 24, 26 etc. For example, a portion of the lubricating oil flowing out from the pipe 30 flows through a coil portion of the stator 14 as indicated by an arrow A to cool the coil and flows into a central portion of the rotating machine 10 so that a portion of the lubricating oil is supplied to the bearing 26 on the second casing member 22 side to lubricate the bearing 26.

Figure 2:
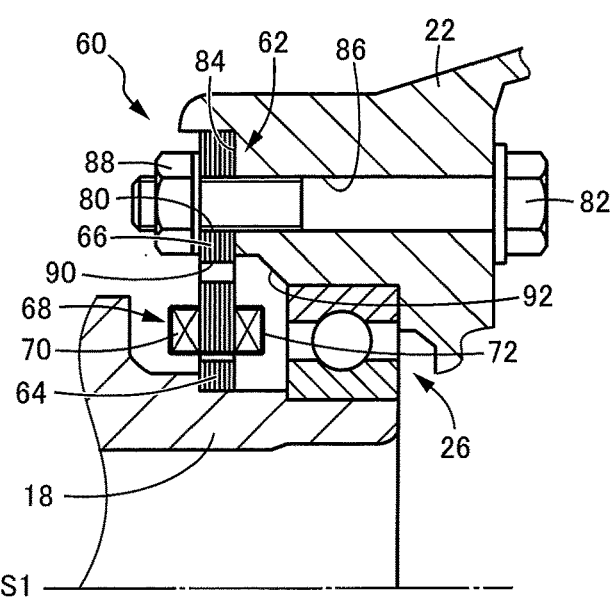
FIG. 2 is an enlarged cross-sectional view of a mounting portion of a resolver disposed in a casing of the rotating machine of FIG. 1.
Figure 3:
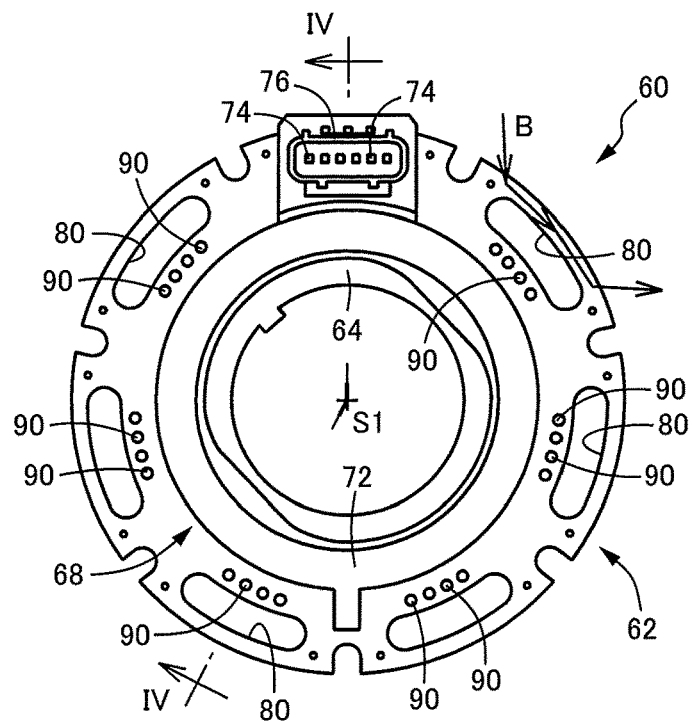
FIG. 3 is a front view showing the resolver alone.
Figure 4:
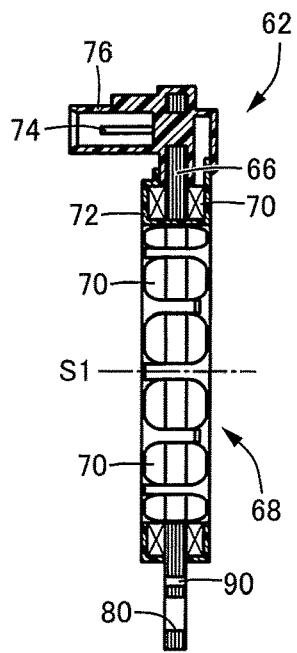
FIG. 4 is a cross-sectional view of a resolver stator taken along a line IV-IV and viewed in a direction of arrows of FIG. 3.

A resolver 60 is disposed concentrically with the first axis S1 in a portion between the bearing 26 and the rotor 16 in the direction parallel to the first axis S1 in the casing 12. FIG. 2 is an enlarged cross-sectional view of a mounting portion of the resolver 60, FIG. 3 is a front view showing the resolver 60 alone, and FIG. 4 is a cross-sectional view of a resolver stator 62 taken along a line IV-IV and viewed in a direction of arrows of FIG. 3. A center line of the resolver 60 is shown with S1 in FIGS. 3 and 4 since the center line coincides with the first axis S1 in a state of being assembled to the rotating machine 10. The resolver 60 includes the annular resolver stator 62 fixed to an inner side surface of the second casing member 22 in an outer circumferential portion and a resolver rotor 64 disposed on the inner circumferential side of the resolver stator 62 and fixed to and integrally rotated with the shaft 18. As is clear from FIG. 3, the resolver rotor 64 is made up of a layered steel plate obtained by layering a multiplicity of annular steel plates having outer circumferential surfaces formed into elliptical or oval shape and is mounted relatively non-rotatably on the shaft 18 by a rotation stop key etc.

The resolver stator 62 includes a layered steel plate 66 obtained by layering a multiplicity of annular steel plates and a coil portion 68 for rotation detection disposed on an inner circumferential edge portion of the annular layered steel plate 66, and the resolver rotor 64 is disposed on the inner circumferential side of the coil portion 68 with a slight clearance therebetween. The coil portion 68 is disposed to project from the layered steel plate 66 on both sides in the direction parallel to the first axis S1 and includes multiple coils 70 for excitation and rotation detection, and outer circumference surfaces and both side surfaces of the coils 70 are covered with a cover 72 made of synthetic resin. In the resolver stator 62, a connector 76 including therein multiple connection terminals 74 connected to the coils 70 to excite the coils 70 and extract rotation signals is disposed on an outer circumferential portion of the layered steel plate 66. The connector 76 is integrally formed on the layered steel plate 66 and made of a synthetic resin material, for example.

In a fixed part which is fixed to the second casing member 22 and is located in the outer circumferential portion of the layered steel plate 66, multiple bolt holes 80 having a circular arc shape around the first axis S1 are disposed at equal angular intervals around the first axis S1, and the resolver stator 62 is fixed to the second casing member 22 by bolts 82 inserted through the bolt holes 80. The inner side surface of the second casing member 22 is provided with a flat annular mounting seat 84 perpendicular to the first axis S1, and the layered steel plate 66 is seated and fixed by the bolts 82 such that the outer circumferential portion of the layered steel plate 66 is brought into close contact with the mounting seat 84. The mounting seat 84 is provided with multiple bolt insertion holes 86 parallel to the first axis S1 corresponding to the multiple bolt holes 80, and each bolt 82 is inserted from the second casing member 22 side to penetrate the respective bolt insertion hole 86 and the bolt hole 80 of the layered steel plate 66, and is screw-fastened by respective nut 88 screwed at tip threaded portions projected from the bolt holes 80. A mounting angle (phase) of the resolver stator 62 around the first axis S1 can be adjusted within a range of the circular-arc-shaped bolt holes 80. In this example, the seven bolt holes 80 are disposed around the first axis S1, and the connector 76 is integrally formed by using one of the bolt holes 80, while the resolver stator 62 is fixed to the second casing member 22 by using the remaining six bolt holes 80. All the six bolt holes 80 may not necessarily be used for screw-fastening, and the screw-fastening may be achieved with one or more of the bolt holes 80 left unused.

Multiple oil through-holes 90 are provided on the resolver stator 62 along the circular arc of the bolt holes 80 at a portion on the inner circumferential side of the multiple circular-arc-shaped bolt holes 80, specifically, on the inner circumferential side relative to the fixed part brought into close contact with the mounting seat 84 and on the outer circumferential side relative to the coil portion 68. In this example, the four oil through-holes 90 each having a round hole shape (a circular cross section) are disposed side by side to form a circular arc shape around the first axis S1 for each of the bolt holes 80. Since the bolt holes 80 are disposed at equal angular intervals around the first axis S1, the oil through-holes 90 are also provided as groups of four oil through-holes at equal angular intervals around the first axis S1, and a portion of the groups is located on the upper side relative to the first axis S1 in a state of being assembled to the rotating machine 10 shown in FIG. 1 and each group of four oil through-holes 90 corresponds to the oil through-hole of the present invention. Therefore, as indicated by the arrow A of FIG. 1, a portion of the lubricating oil flowing down from the coil portion of the stator 14 flows into the oil through-holes 90 directly, or indirectly by being scattered due to the rotation of the rotor 16 and the shaft 18, and is supplied to the bearing 26, so that the bearing 26 can properly be lubricated regardless of the presence of the resolver 60. A tapered surface 92 having an inner diameter gradually reduced toward the bearing 26 is provided on the inner circumferential side portion of the mounting seat 84 of the second casing member 22, i.e., on a portion having substantially the same diameter dimension as the oil through-holes 90 around the first axis S1 and facing the oil through-holes 90, so that the lubricating oil is smoothly guided toward the bearing 26. The four oil through-holes 90 are designed to be used as through-holes for a jig guiding a wire of the coils 70 of the coil portion 68 during a manufacturing process of the resolver stator 62.

In the lubrication structure of the rotating machine 10 of this example as described above, since the oil through-holes 90 are disposed in the inner circumferential side portion of the resolver stator 62 fixed to the mounting seat 84 on the inner side surface of the casing 12, a portion of the lubricating oil flowing down from the coil portion of the stator 14 flows into the oil through-holes 90 directly, or indirectly by being scattered due to the rotation of the rotor 16 and the shaft 18, and is supplied to the bearing 26. Since the resolver stator 62 is fixed to the casing 12, the risk of scattering the lubricating oil due to a centrifugal force is eliminated, and the bearing 26 can be supplied and properly lubricated with a sufficient amount of the lubricating oil by appropriately determining the size, number, position, etc. of the oil through-holes 90.

Since the multiple oil through-holes 90 are disposed around the first axis S1 including an area above the first axis S1 on the outer circumferential side of the coil portion 68 disposed in an inner circumferential edge portion of the resolver stator 62, a portion of the lubricating oil flowing down from the coil portion of the stator 14 flows into the multiple oil through-holes 90 directly, or indirectly by being received by the coil portion 68 or being scattered due to the rotation of the rotor 16 and the shaft 18, and is more easily supplied to the bearing 26, so that the bearing 26 can properly be lubricated.

Since the resolver stator 62 is provided with the multiple bolt holes 80 having a circular arc shape around the first axis S1 at equal angular intervals around the first axis S1, and the oil through-holes 90 are provided on the resolver stator 62 along the bolt holes 80 on the inner circumferential side portion of the bolt holes 80, the presence of the oil through-holes 90 increases a magnetic resistance on the inner circumferential side portion of the bolt holes 80, so that a magnetic flux from the outside more easily flows through an outer circumferential side portion of the bolt holes 80 as indicated by an arrow B of FIG. 3 which has a relatively low magnetic resistance in the resolver stator 62. As a result, the coils 70 in the coil portion 68 disposed in the inner circumferential edge portion of the resolver stator 62 are hardly affected by magnetism of a stator coil etc. of the rotating machine 10 functioning as an electric motor and a generator, so that a magnetic noise is suppressed, and the resolver 60 is improved in rotation detection accuracy. Since the bolt holes 80 and the groups of the oil through-holes 90 are disposed at equal angular intervals around the first axis S1, the magnetic resistance etc. are uniformly distributed around the first axis S1, and this is also advantageous for the rotation detection accuracy of the resolver 60.

Other examples of the present invention will be described. In the following examples, portions substantially common to the examples are denoted by the same reference numerals and will not be described in detail.

Figure 5:
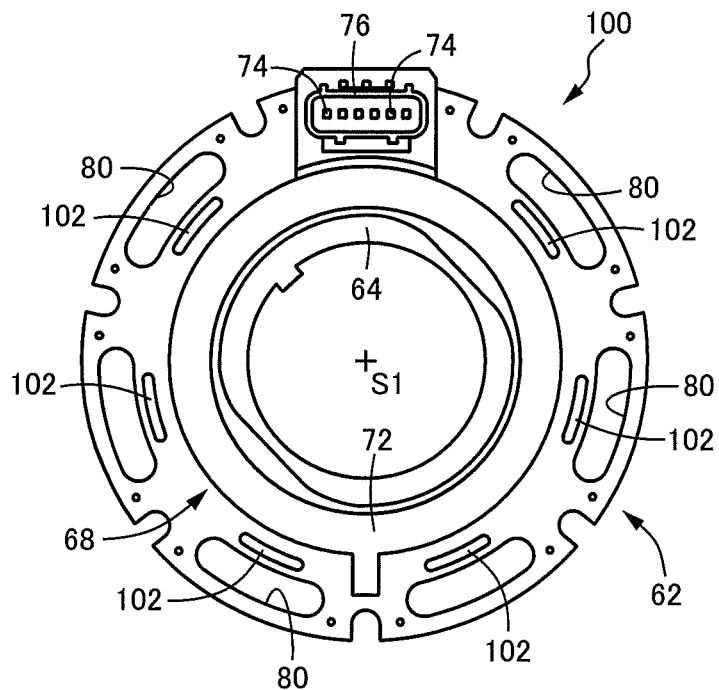
FIG. 5 is a diagram for explaining another example of oil through-holes provided in the resolver stator and is a front view of the resolver corresponding to FIG. 3.

FIG. 5 is a diagram corresponding to FIG. 3 and is a front view of a resolver 100. This resolver 100 is different from the resolver 60 in shape of oil through-holes 102 and has circular-arc-shaped oil through-holes 102 on the resolver stator 62, each disposed along the corresponding bolt holes 80 on the inner circumferential side of the multiple bolt holes 80. Specifically, each of the oil through-holes 102 of this example forms a long hole shape connecting the four oil through-holes 90 and provides substantially the same effects as the example described above. The shape of the oil through-holes is appropriately defined as a straight-line shape, an elliptical shape, etc. Each oil through-hole 102 corresponds to the oil through-hole of the present invention.

Figure 6:
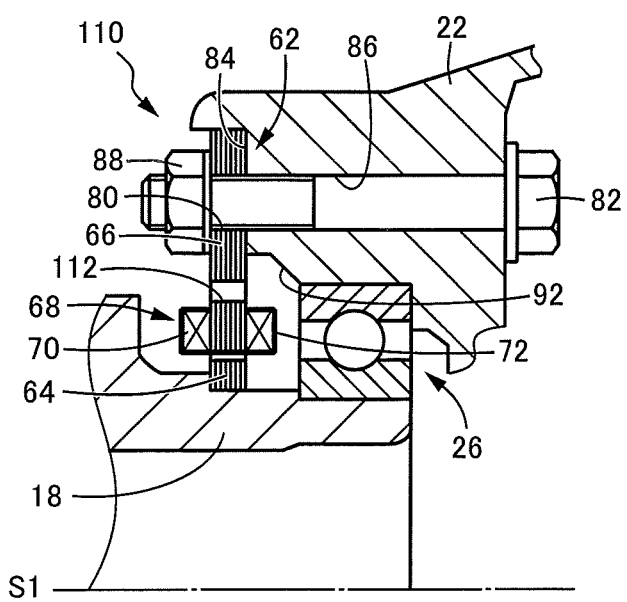
FIG. 6 is a diagram for explaining a further example of the oil through-holes provided in the resolver stator and is a cross-sectional view of the mounting portion of the resolver corresponding to FIG. 2.

FIG. 6 is a cross-sectional view of the resolver 110 of another example corresponding to FIG. 2, and this resolver 110 is different from the resolver 60 of the previous example in position of oil through-holes 112. Specifically, the oil through-holes 112 are disposed at a radial position where each of the oil through-holes 112 faces at least a portion of the bearing 26 in a direction parallel to the first axis S1, i.e., at an inner circumferential position closer to the first axis S1 as compared to the oil through-holes 90 of the example described above. In this case, the lubricating oil flowing out from the oil through-holes 112 toward the bearing 26 is more easily directly supplied to the bearing 26, and the bearing 26 can efficiently be lubricated. For example, the oil through-holes 112 may be groups each composed of multiple round holes, each group provided on the inner circumferential side for each of the bolt holes 80 as the oil through-holes 90, or may be long holes having a circular arc shape etc. each disposed on the inner circumferential side for each of the corresponding bolt holes 80 as with the oil through-holes 102.

Although the examples of the present invention have been described in detail with reference to the drawings, these examples are merely an embodiment, and the present invention can be implemented in variously modified and improved forms based on the knowledge of those skilled in the art.

REFERENCE SIGNS LIST

10: rotating machine 12: casing 14: stator 16: rotor 18: shaft 26: bearing 30: pipe (lubricating oil passage) 60, 100, 110: resolver 62: resolver stator 64: resolver rotor 68: coil portion 72: cover 80: bolt hole 82: bolt 84: mounting seat (inner side surface) 90, 102, 112: oil through-hole S1: first axis (rotating machine center line)

What is claimed is:

1. A rotating machine lubrication structure applied to a rotating machine including
    a cylindrical stator disposed in a casing concentrically with a rotating machine center line and fixed to the casing,
    a rotor disposed concentrically with the rotating machine center line in the casing and on an inner circumferential side of the stator, and
    a shaft disposed concentrically with the rotating machine center line, rotated integrally with the rotor, and supported rotatably around the rotating machine center line by the casing via a bearing,
    the stator being cooled by a lubricating oil supplied to the stator from a lubricating oil passage disposed in the casing, the bearing being lubricated by the lubricating oil flowing down from the stator, wherein
    a resolver is disposed concentrically with the rotating machine center line between the bearing and the rotor along a direction of the rotating machine center line in the casing, wherein
    the resolver includes an annular resolver stator fixed to an inner side surface of the casing in an outer circumferential portion of the resolver stator, and a resolver rotor disposed on an inner circumferential side of the resolver stator and fixed to and integrally rotated with the shaft, and wherein
    the resolver stator is provided with an oil through-hole allowing the lubricating oil to flow through at a portion on an inner circumferential side relative to a part fixed to the casing.

2. The rotating machine lubrication structure according to claim 1, wherein
    the oil through-hole is disposed at a radial position facing at least a portion of the bearing in the direction parallel to the rotating machine center line.

3. The rotating machine lubrication structure according to claim 2, wherein
    a coil portion for rotation detection covered with a cover is disposed on an inner circumferential edge portion of the resolver stator to project to both sides in a direction parallel to the rotating machine center line, and wherein
    the oil through-hole is disposed on an outer circumferential side relative to the coil portion and at a position above the rotating machine center line.

4. The rotating machine lubrication structure according to claim 3, wherein
    the oil through-hole is one of a plurality of oil through-holes disposed at positions around the rotating machine center line and a portion of the plurality of oil through-holes is disposed at the position above the rotating machine center line.

5. The rotating machine lubrication structure according to claim 4, wherein
    a plurality of bolt holes having a circular arc shape around the rotating machine center line is disposed in the resolver stator at equal angular intervals around the rotating machine center line, wherein the resolver stator is fixed to the casing by bolts inserted through the bolt holes, and wherein
    the oil through-hole is disposed along the bolt hole on an inner circumferential side relative to each of the plurality of bolt holes.

6. The rotating machine lubrication structure according to claim 3, wherein
    a plurality of bolt holes having a circular arc shape around the rotating machine center line is disposed in the resolver stator at equal angular intervals around the rotating machine center line, wherein the resolver stator is fixed to the casing by bolts inserted through the bolt holes, and wherein
    the oil through-hole is disposed along the bolt hole on an inner circumferential side relative to each of the plurality of bolt holes.

7. The rotating machine lubrication structure according to claim 2, wherein
    the oil through-hole is one of a plurality of oil through-holes disposed at positions around the rotating machine center line and a portion of the plurality of oil through-holes is disposed at position above the rotating machine center line.

8. The rotating machine lubrication structure according to claim 7, wherein
    a plurality of bolt holes having a circular arc shape around the rotating machine center line is disposed in the resolver stator at equal angular intervals around the rotating machine center line, wherein the resolver stator is fixed to the casing by bolts inserted through the bolt holes, and wherein
    the oil through-hole is disposed along the bolt hole on an inner circumferential side relative to each of the plurality of bolt holes.

9. The rotating machine lubrication structure according to claim 2, wherein
    a plurality of bolt holes having a circular arc shape around the rotating machine center line is disposed in the resolver stator at equal angular intervals around the rotating machine center line, wherein the resolver stator is fixed to the casing by bolts inserted through the bolt holes, and wherein
    the oil through-hole is disposed along the bolt hole on an inner circumferential side relative to each of the plurality of bolt holes.

10. The rotating machine lubrication structure according to claim 1, wherein
    a coil portion for rotation detection covered with a cover is disposed on an inner circumferential edge portion of the resolver stator to project to both sides in a direction parallel to the rotating machine center line, and wherein
    the oil through-hole is disposed on an outer circumferential side relative to the coil portion and at a position above the rotating machine center line.

11. The rotating machine lubrication structure according to claim 10, wherein
    the oil through-hole is one of a plurality of oil through-holes disposed at positions around the rotating machine center line and a portion of the plurality of oil through-holes is disposed at the position above the rotating machine center line.

12. The rotating machine lubrication structure according to claim 11, wherein
- a plurality of bolt holes having a circular arc shape around the rotating machine center line is disposed in the resolver stator at equal angular intervals around the rotating machine center line, wherein the resolver stator is fixed to the casing by bolts inserted through the bolt holes, and wherein
- the oil through-hole is disposed along the bolt hole on an inner circumferential side relative to each of the plurality of bolt holes.

13. The rotating machine lubrication structure according to claim 10, wherein
- a plurality of bolt holes having a circular arc shape around the rotating machine center line is disposed in the resolver stator at equal angular intervals around the rotating machine center line, wherein the resolver stator is fixed to the casing by bolts inserted through the bolt holes, and wherein
- the oil through-hole is disposed along the bolt hole on an inner circumferential side relative to each of the plurality of bolt holes.

14. The rotating machine lubrication structure according to claim 1, wherein
- the oil through-hole is one of a plurality of oil through-holes disposed at positions around the rotating machine center line and a portion of the plurality of oil through-holes is disposed at a position above the rotating machine center line.

15. The rotating machine lubrication structure according to claim 14, wherein
- a plurality of bolt holes having a circular arc shape around the rotating machine center line is disposed in the resolver stator at equal angular intervals around the rotating machine center line, wherein the resolver stator is fixed to the casing by bolts inserted through the bolt holes, and wherein
- the oil through-hole is disposed along the bolt hole on an inner circumferential side relative to each of the plurality of bolt holes.

16. The rotating machine lubrication structure according to claim 1, wherein
- a plurality of bolt holes having a circular arc shape around the rotating machine center line is disposed in the resolver stator at equal angular intervals around the rotating machine center line, wherein the resolver stator is fixed to the casing by bolts inserted through the bolt holes, and wherein
- the oil through-hole is disposed along the bolt hole on an inner circumferential side relative to each of the plurality of bolt holes.

* * * * *